United States Patent
Al Rifai (10) Patent No.: US 9,852,391 B2
(45) Date of Patent: Dec. 26, 2017

(54) SYSTEM AND METHOD FOR LOGISTICS NETWORK UTILIZING MOBILE DEVICE LOCATION INFORMATION

(71) Applicant: MENA360 DWC-LLC, Dubai Logistics, DWC, Dubai (AE)

(72) Inventor: Idriss O. Al Rifai, Dubai Logistics (AE)

(73) Assignee: MENA360 DWC-LLC, Dubai Logistics, DWC, Dubai (AE)

( * ) Notice: Subject to any disclaimer, the term of this patent is extended or adjusted under 35 U.S.C. 154(b) by 103 days.

(21) Appl. No.: 14/629,289

(22) Filed: Feb. 23, 2015

(65) Prior Publication Data

US 2015/0242810 A1    Aug. 27, 2015

Related U.S. Application Data

(60) Provisional application No. 61/943,460, filed on Feb. 23, 2014, provisional application No. 61/943,305, filed on Feb. 22, 2014.

(51) Int. Cl.
*G06Q 30/00* (2012.01)
*G06Q 10/08* (2012.01)
*H04W 4/02* (2009.01)
*H04W 64/00* (2009.01)

(52) U.S. Cl.
CPC ........ *G06Q 10/0834* (2013.01); *H04W 4/025* (2013.01); *H04W 64/00* (2013.01)

(58) Field of Classification Search
CPC .......................... G06Q 10/0834; H04W 4/025
See application file for complete search history.

(56) References Cited

U.S. PATENT DOCUMENTS

| 7,177,825 | B1 | 2/2007 | Borders et al. |
| 2003/0195843 | A1* | 10/2003 | Matsuda et al. ................ 705/39 |
| 2004/0193314 | A1 | 9/2004 | Tilles et al. |
| 2009/0127327 | A1 | 5/2009 | Rani et al. |
| 2010/0293106 | A1 | 11/2010 | Rhoads et al. |

(Continued)

FOREIGN PATENT DOCUMENTS

| WO | 2012178047 A1 | 12/2012 | |
| WO | WO 2012/178047 A1 * | 12/2012 | ............ G06Q 30/00 |

OTHER PUBLICATIONS

Samitha Samaranayake "Routing strategies for the reliable and efficient utilization of road networks" Civil and Environmental Engineering, University of California, Berkeley, Fall 2014. (UMI No. 3686005).*

(Continued)

*Primary Examiner* — Naeem U Haq
(74) *Attorney, Agent, or Firm* — Perkins Coie LLP (57) ABSTRACT

Technology is disclosed for enabling an efficient logistics network based on mobile device location data. The technology does not necessarily need the street house numbers as delivery or pickup addresses, which are not available in some areas of the world. The location data (e.g., GPS coordinates) of the customers' mobile devices are used to suggest the logistics delivery and pickup locations. Drivers of the logistics network are equipped with logistics driver devices connected to a logistics data server for retrieving the location data. Guided by the location data, the drivers reach the target locations for the delivery or pickup tasks.

23 Claims, 6 Drawing Sheets

(56) References Cited

U.S. PATENT DOCUMENTS

2011/0055046 A1\* 3/2011 Bowen et al. ............. 705/26.41
2014/0236856 A1  8/2014 Baykhurazov
2015/0262125 A1  9/2015 Sager
2015/0317597 A1  11/2015 Shucker et al.

OTHER PUBLICATIONS

Terry W. Griffin "GPS CaPPture: A System for GPS Trajectory Collection, Processing, and Destination Prediction" University of North Texas, May 2012. (UMI No. 3533622).\*
International Search Report and Written Opinion in International Application No. PCTUS2015017162, dated May 27, 2015, 11 pages.
International Search Report and Written Opinion PCT/US2016/067613 dated Mar. 22, 2017, pp. 1-8.

\* cited by examiner

SYSTEM AND METHOD FOR LOGISTICS NETWORK UTILIZING MOBILE DEVICE LOCATION INFORMATION

CROSS-REFERENCE TO RELATED APPLICATIONS

This application claims the benefit of U.S. Provisional Patent Application No. 61/943,460, entitled "SYSTEM AND METHOD FOR LOGISTICS NETWORK UTILIZING MOBILE DEVICE LOCATION INFORMATION" and filed on Feb. 23, 2014, and U.S. Provisional Patent Application No. 61/943,305, entitled "LOGISTICS NETWORK UTILIZING MOBILE DEVICE LOCATION INFORMATION" and filed on Feb. 22, 2014. The contents of the above-identified applications are incorporated by reference herein in their entirety.

BACKGROUND

In some countries and areas, there is no street address or house numbering system. For instance, some streets in Dubai, United Arab Emirates have street names; however, many streets do not have a unique number to each building in a street. As a result, it is not easy to locate a particular building in Dubai for the purpose of, e.g., package delivery. The residents in Dubai have to rent post office boxes and go to local post office branches to pick up their mails and packages.

The customers in places like Dubai have no actual delivery address to enter when they place online orders on e-commerce websites. They have to leave a detailed description of driving direction to the delivery locations, and leave their phone numbers so that drivers of delivery companies can call the customers for direction guidance. Such a delivery process is inefficient and costly for customers, delivery companies, and e-commerce companies.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is a technology that enables an efficient logistics network by using mobile device location data. The technology retrieves location data (e.g., GPS coordinates) of mobile devices used by the customers. The location data of the customers' mobile devices are used to suggest the logistics delivery and pickup locations. Drivers of the logistics network are equipped with logistics driver devices connected to a logistics data server for retrieving the location data and other information. Using the location data, logistics driver devices guide the drivers to reach the target locations for the delivery or pickup tasks. The technology does not necessarily need the street house numbers as delivery or pickup addresses, which are not available in some areas of the world. The location data are stored in a database for expediting future delivery or pickup requests.

Figure 1:
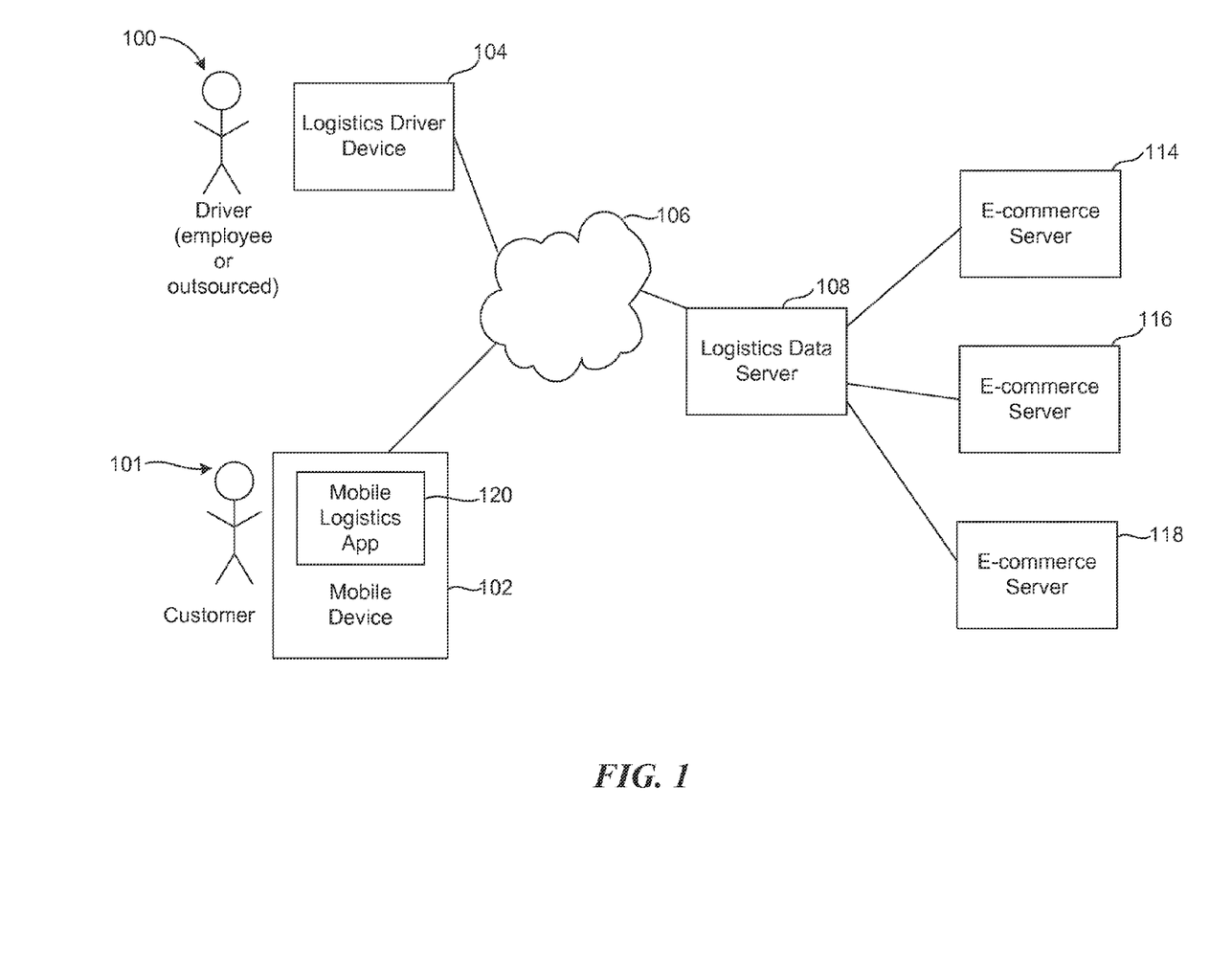
FIG. 1 illustrates an environment in which the logistics technology can be implemented.

FIG. 1 illustrates an environment in which the logistics technology can be implemented. The environment includes a mobile device 102 of a customer 101 (also referred to as "consumer" or "user"), and a logistics driver device 104 operated by a driver 100. Some or all of the drivers can be employees of the owner or operator of the logistics network. Alternatively, the owner or operator of the logistics network can outsource some or all of the drivers by contracting out of some of the driver business to another party. The mobile device 102 can be, for example, a smart phone, tablet computer, notebook computer, or any other form of mobile or desktop processing device. A mobile logistics application 120 runs on the consumer's mobile device 102. The logistics driver device 104 can be also, for example, a smart phone, tablet computer, notebook computer, or any other form of mobile processing device. Alternatively, the logistics driver device 104 can be a computing device integrated with the vehicle of the driver 100.

The environment also includes a server 108 of a logistics data tracking and management system (hereinafter "logistics data server 108"), and computer systems 114, 116 and 118 of various e-commerce companies (hereinafter "e-commerce servers 114, 116 and 118"). Each of the aforementioned computer systems can include one or more distinct physical computers and/or other processing devices which, in the case of multiple devices, can be connected to each other through one or more wired and/or wireless networks.

The mobile device 102 and the logistics driver device 104 can be coupled to the logistics data server 108 through an internetwork 106, which can be or include the Internet and one or more wireless networks (e.g., a WiFi network and or a cellular telecommunications network). The e-commerce servers 114, 116 and 118 can be coupled to the logistics data server 108 through the internetwork 106 as well. Alternatively, the e-commerce servers 114, 116 and 118 can be coupled to the logistics data server 108 through one or more dedicated networks, such as fiber networks.

Figure 2:
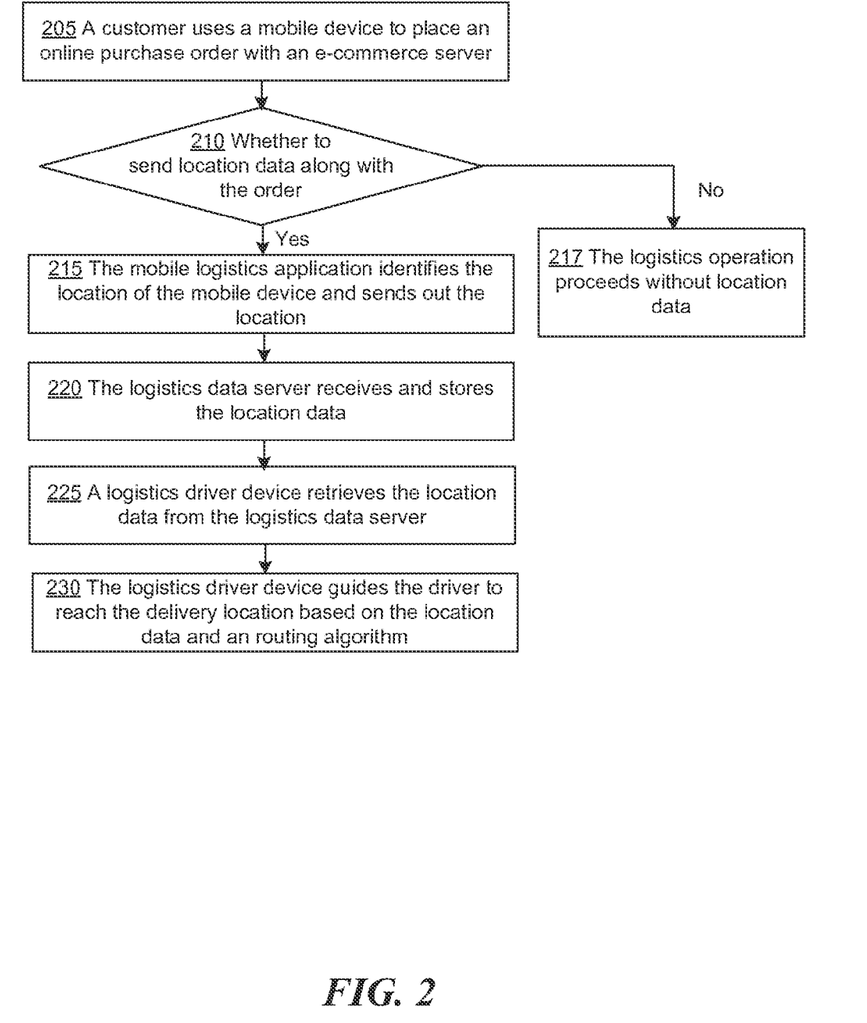
FIG. 2 illustrates an example of a process of conducting a logistics operation using mobile device location data, according to various embodiments.

FIG. 2 illustrates an example of a process of conducting a logistics operation using mobile device location data, according to various embodiments. Initially, the customer 101 may use the mobile device 102 to place an online purchase order with, e.g., the e-commerce server 114 (block 205). The order can be placed through the mobile logistics application 120 or another application running on the mobile device 102. The mobile logistics application 120 detects the placed order and prompts the consumer 101 via a display of the mobile device 102 whether to send a location along with the order to the e-commerce server 114 (block 210). The consumer 101 confirms sending the location by, e.g., click "yes" button on the prompt interface. In response to the consumer 101's confirmation, the mobile logistics application identifies the location of the mobile device 102 and sends out the location data (block 215). The mobile logistics application 120 may further identify a category of the location, such as "residence," "work," or "school." The consumer 101 may further specify the preferred delivery data and/or time based on the user inputs. The consumer 101 can add additional specification (e.g., "Deliver to neighbor", "Deliver to another customer"). If the consumer chooses to not sending the location data, the logistics operation can proceed without the help of the location data (block 217).

The location of the mobile device 102 can be identified using various technologies of the mobile device 102. For instance, the mobile device 102 may determine a set of location coordinates based on a satellite navigation system (e.g., GPS, GLONASS, Beidou, or Galileo). The mobile device 102 may further identify its accurate location within a building using positioning signals such as Assisted GPS (A-GPS). Alternatively, the mobile device 102 may determine its location based on the cellphone network (e.g., cell identification or triangulation) or the WiFi network. The mobile device 102 can further use a combination of the technologies to determine its location.

The logistics data server 108 receives the location data from the mobile device 102, and may further relay the location data to the e-commerce server 114. The logistics data server 108 stores the location data and its category (if any) in its database (block 220). The location entry in the database may be identified by a cellphone number of the mobile device 102, name or ID number of the consumer 101, or other types of identification of the consumer 101. The database of the logistics data server 108 may further store the information of the purchase order including, e.g., order number or preferred delivery date and time, customer name as well as any other information deemed important.

The location data of customers' mobile devices form an internal address system for the customers. Even for areas having no street house number scheme, delivery agencies can use the location data to identify and reach the delivery locations.

To fulfil the customer's purchase order, the e-commerce server 114 tenders a package to a delivery agency. A driver 100 of the delivery agency is responsible for delivering the package. The logistics driver device 104 of the driver 100 retrieves the location data (e.g., GPS coordinates) from the logistics data server 108 (block 225). Based on the location data, the logistics deriver device 104 can use a routing algorithm to define an optimal route that guides the driver 100 to reach the delivery location (e.g., via GPS navigation) (block 230). The logistics driver device 104 may send its own location and information regarding the delivery to the logistics data server 108.

The consumer 101 can check the order status and delivery status on the mobile logistics application 120 running on the mobile device 102. The mobile logistics application 120 retrieves the location information of the logistics driver device 104 from the logistics data server 108. Based on the information of the driver 100, the consumer 101 is aware of the status including, e.g., whether the package is out for delivery, or whether the driver's next stop is to deliver the package of the consumer 101, what is the exact current location of the driver 100, or what is the estimated time of arrival.

The process helps to predict the day and date of the delivery. The customer does not have to wait for the delivery specified by a delivery agency. Instead, based on the historical order and delivery information of consumer 101, the logistics data server 108 predicts the location and the time of the day that the customer is likely to receive a given delivery. Based on the prediction, the logistics driver device 104 inserts the delivery task into its routing schedule and notifies the logistics data server 108. The logistics data server 108 pushes information to the customer's mobile device 102 to notify the customer of the expected delivery time based on consumer 101's specified delivery location.

In some embodiments, the logistics data server 108 can further establish a communication platform between the mobile device 102 and the logistics driver device 104. For instance, via the logistics data server 108, the mobile logistics application 120 may send a consumer's message to the logistics driver device 104 to indicate the latest information required to perform the delivery, such as "please leave the packing at the front desk," "please come inside the building through the back door," or "please deliver to the 37th floor."

Similarly, the driver 100 using the logistics driver device 104 can send messages to the consumer 101 using the mobile device 102. For instance, the driver 100 may manually sends an estimated time of arrival to the consumer 101. If the building of the location has multiple tenants or occupants, the driver 100 may inquire the consumer 101 to clarify the actual delivery location in the building.

The logistics data server 108 can also send tracking information of the delivery process to the e-commerce servers 114, 116 and 118. Each delivery can be identified using a unique ID number (e.g., using an order number or a logistics tracking number). Through the data pipelines between the logistics data server 108 and the e-commerce servers, e-commerce companies can track the delivery status in real time.

In some embodiments, the logistics data server 108 can create a marketplace where the drivers can bid for delivery and pickup jobs. The logistics data server 108 can push the information of the jobs to the logistics driver devices 104. For example, the logistics driver devices 104 can display, e.g., "task x to be accomplished," "picking up at place x at time xxx," delivery to place with GPS coordinate xxxx at time yyyy," etc. The drivers can bid for the jobs through the logistics driver devices 104 or other electronic devices. The logistics data server 108 can determine which driver wins the bidding based on multiple factors, e.g., past performance of the driver on jobs, driver' ability to complete the jobs, etc. The logistics data server 108 can also consider the price offered by the drivers for completing the job during the determination process. The logistics data server 108 can combine the delivery and the pickup as a single job for the bidding purpose, or treat the delivery and the pickup as separate jobs (inbound and outbound jobs).

In some embodiments, the logistics data server 108 can handle logistics tasks associated with economic situations other than online e-commerce. For example, a government can have logistics needs for delivering official documents (e.g., government issued ID cards) to customers or citizens. The logistics data server 108 can be used to handle the delivery of the official documents.

Furthermore, the logistics data server 108 can be used in mature economics for customers who want to receive anything wherever they are, no matter what their official addresses are. In some of the places for pickups or deliveries, street numbers are not available, or the street numbers are not used for delivery or pickup of the order for convenience or any other reasons.

Those skilled in the art will appreciate that the logic illustrated in FIG. 2 and described above, and in each of the flow diagrams discussed below, may be altered in a variety of ways. For example, the order of the logic may be rearranged, substeps may be performed in parallel, illustrated logic may be omitted, other logic may be included, etc. The substeps of the FIG. 2 can be combined into a single process.

Figure 3:
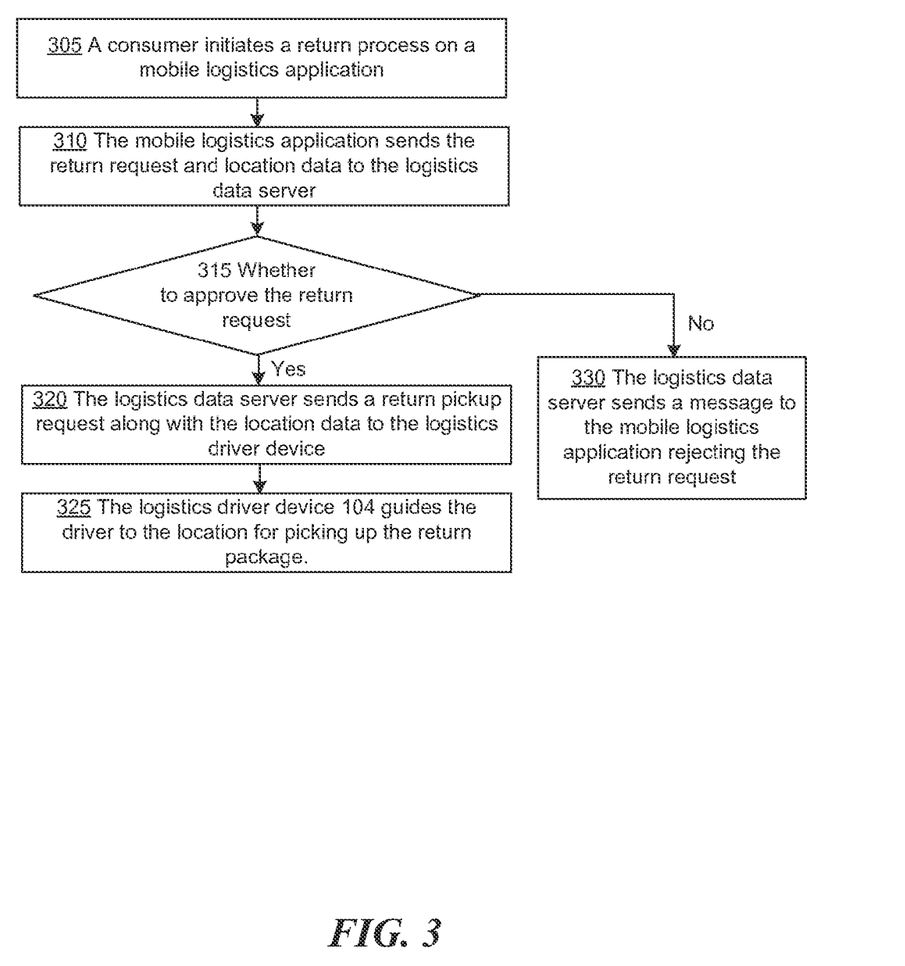
FIG. 3 illustrates an example of a process of conducting a reverse logistics operation, according to various embodiments.

Similarly, a consumer 101 can initiate a return process (i.e., reverse logistics). FIG. 3 illustrates an example of a process of conducting a reverse logistics operation, according to various embodiments. The consumer 101 initiates the return process on the mobile logistics application 120 (block 305). The mobile logistics application 120 may send the return request and the location data to the logistics data server 108 (block 310). Alternatively, the mobile logistics application 120 may not need to send out the location data. The consumer 101 may confirm that the return pickup location is the same as the previously sent order delivery location. The logistics data server 108 may use the previously stored location data.

The logistics data server 108 determines whether to approve or deny the return request (block 315). Alternatively, the logistics data server 108 may forward the return request to the e-commerce servers 114, 116 or 118, and retrieve the approval or denial from the e-commerce servers. Once the return request is approved, the logistics data server sends a pickup request to the logistics driver device 104, along with the location data (block 320). The logistics driver device 104 guides the driver 100 to the location for picking up the return package (block 325). If the return request is denied, the logistics data server 108 sends a message to the mobile logistics application 120 rejecting the pickup request (block 330).

Figure 4:
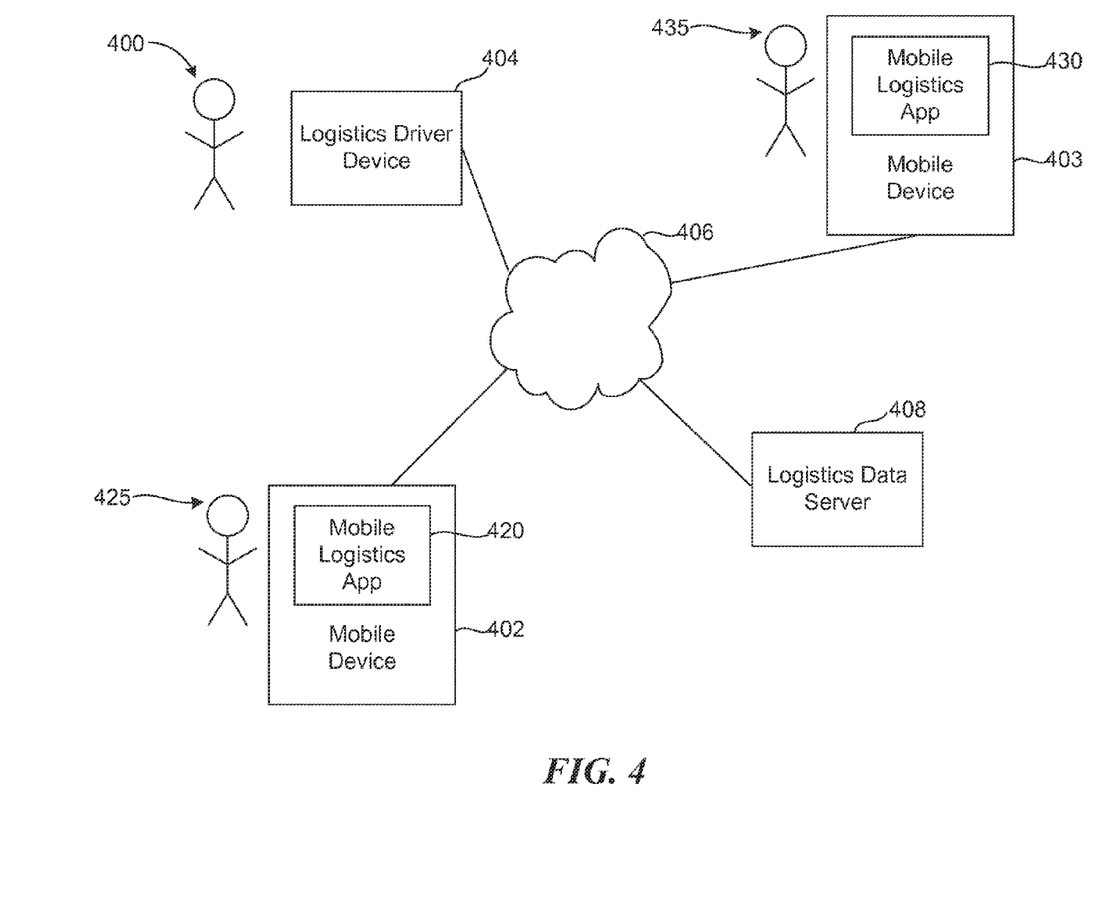
FIG. 4 illustrates an environment in which the logistics technology can be utilized for a delivery between two users.

The logistics technology can be applied to a delivery between a commercial company and a customer, as well as a delivery between two customers (also referred to as "users"). FIG. 4 illustrates an environment in which the logistics technology can be utilized for a delivery between two users. The environment include a mobile device 402 of a user 425, a mobile device 403 of another user 435 and a logistics driver device 404 operated by a driver 400. The mobile devices 402 and 403 can be, for example, a smart phone, tablet computer, notebook computer, or any other form of processing device. Mobile logistics applications 420 and 430 run on the mobile devices 402 and 403 respectively. The logistics driver device 404 can be also, for example, a smart phone, tablet computer, notebook computer, or any other form of processing device. Alternatively, the logistics driver device 404 can be a computing device integrated with a vehicle of the driver 100.

The environment also includes logistics data server 408, which can include one or more distinct physical computers and/or other processing devices which, in the case of multiple devices, can be connected to each other through one or more wired and/or wireless networks. The mobile devices 402 and 403 and the logistics driver device 404 can be coupled to the logistics data server 408 through an internetwork 106, which can be or include the Internet and one or more wireless networks (e.g., a WiFi network and or a cellular telecommunications network).

Figure 5:
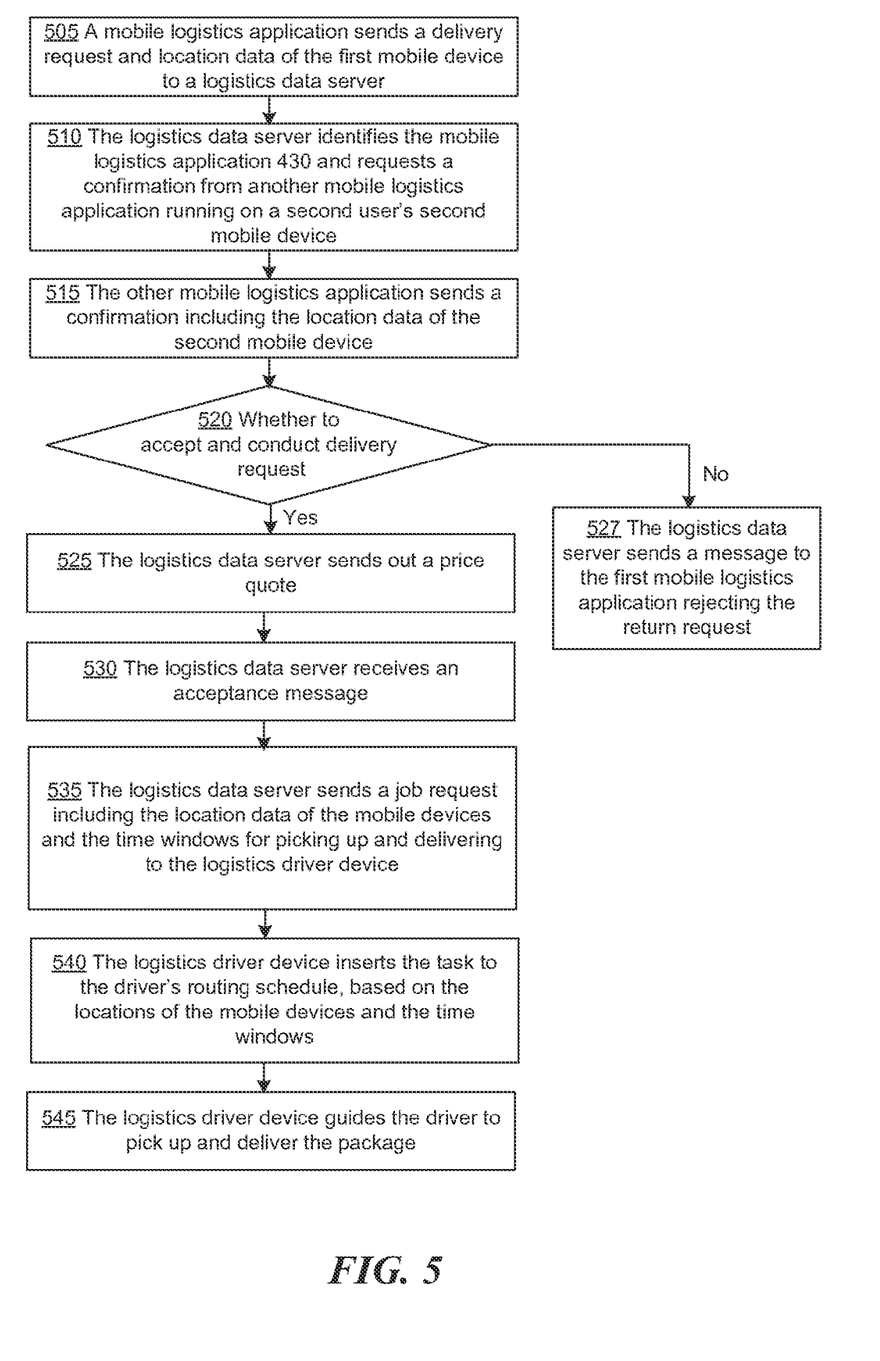
FIG. 5 illustrates an example of a process of conducting a logistics operation for a delivery between two users, according to various embodiments.

FIG. 5 illustrates an example of a process of conducting a logistics operation for a delivery between two users, according to various embodiments. The users 425 and 435 may be a seller and a buyer on an internet consumer-to-consumer auction website, or simply two persons who want to delivery packages or mails between each other.

The user 425 uses the mobile logistics application 420 running on the mobile device 402 to initiate a request for delivery. The mobile logistics application sends the delivery request and location data of the mobile device 402 to the logistics data server 408 (block 505). The delivery request can include, e.g., the identification of the user 435, the information of the package (e.g., weight and size), time windows for picking up the package and delivering the package, and an amount to be collected if cash-on-delivery is requested, or any additional information considered essential to complete the delivery.

Based on the identification of the user 435, the logistics data server 408 identifies the mobile logistics application 430 and requests a confirmation from the mobile logistics application running on user 435's mobile device 403 (block 510). In response, the mobile logistics application 430 sends a confirmation including the location data of the mobile device 403 to the logistics data server 408 (block 515) In response to the confirmation, the logistics data server 408 determines whether to accept and conduct the delivery request (block 520). The logistics data server 408 may make the determination based on, e.g., the location data of the mobile devices 402 and 403, the information of the package, etc.

In some embodiments, the logistics data server 408 can communicate with a server of an electronic marketplace (e.g., ebay) to receive data regarding the transaction, the buyer and the seller. Using the data, the logistics data server 408 initiates the process of collecting the cash (if the transaction involves cash on delivery), picking up of the product from the seller and delivering the product to the buyer.

If the logistics data server 408 determines to accept and conduct the delivery request, the logistics data server 408 may send a price quote to the mobile logistics application 420 or 430, depending on whether the user 425 or the user 435 is to pay the logistics cost (525). In response, the mobile logistics application 420 or 430 can send an acceptance message to confirm and accept the price quote (530).

If the logistics data server 408 determines to reject the delivery request, it sends a message to the mobile logistics application 420 rejecting the return request.

In response to the acceptance message, the logistics data server 408 sends a job request including the location data of the mobile devices 402 and 403 and the time windows for picking up and delivering to the logistics driver device 404 (block 535). The logistics driver device 404 (or the logistics data server 408 if the process is automated) inserts the delivery task to the driver's routing schedule, based on the locations of the mobile devices 402 and 403 and the time windows (block 540). The logistics driver device 404 then guides the driver 400 to pick up the package from the user 425 and to deliver the package to the user 435 (block 545). If cash-on-delivery is requested, the logistics driver device 404 may prompt the driver 400 to collect an indicated amount of cash from the user 435 when the package is delivered.

Figure 6:
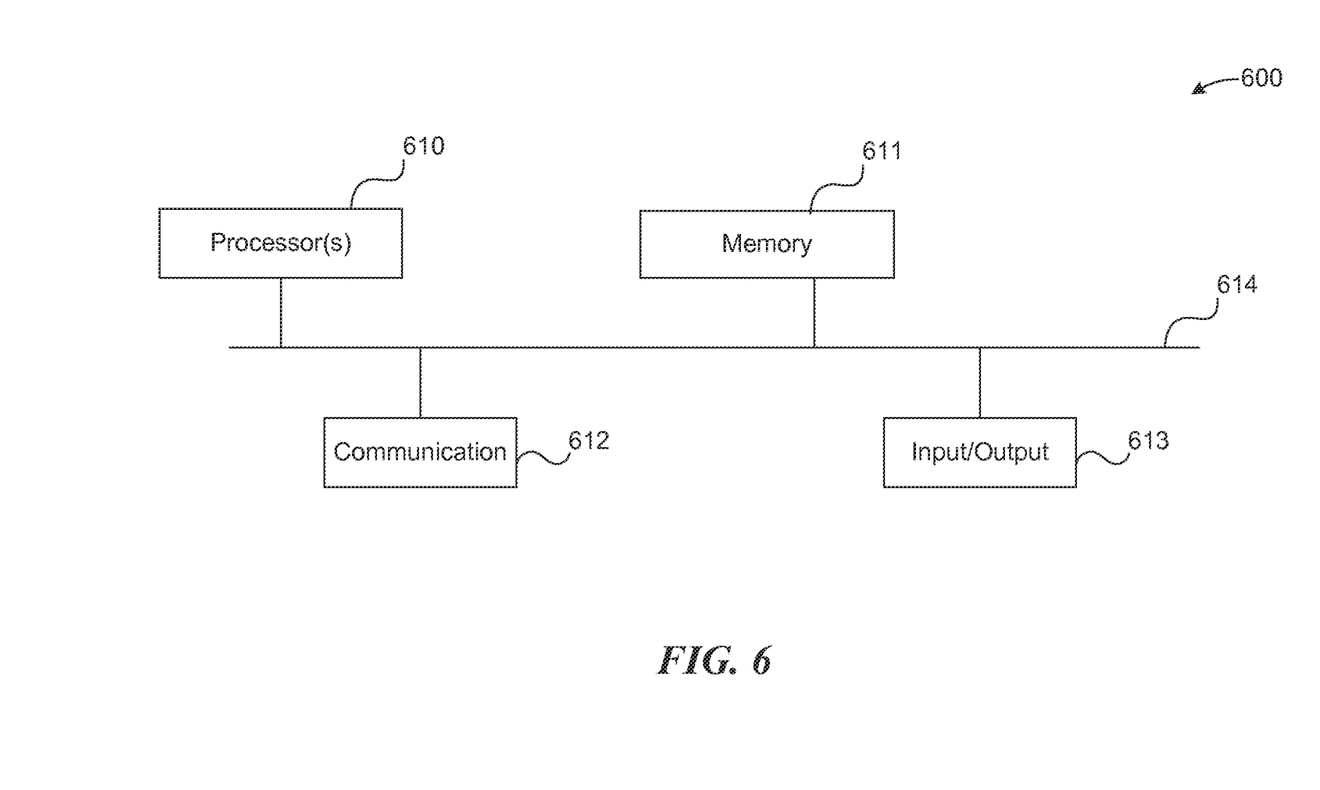
FIG. 6 is a high-level block diagram showing an example of processing system in which at least some operations related to a logistics network can be implemented.

FIG. 6 is a high-level block diagram showing an example of a processing device 800 that can represent any of the devices described above, such as the mobile devices, the logistics driver device, the logistics data server, or the e-commerce servers. As noted above, any of these systems may include two or more processing devices such as represented in FIG. 6, which may be coupled to each other via a network or multiple networks.

In the illustrated embodiment, the processing system 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, adapters and/or other conventional connection devices. The processor(s) 610 may be or include, for example, one or more general-purpose programmable microprocessors, microcontrollers, application specific integrated circuits (ASICs), programmable gate arrays, or the like, or a combination of such devices. The processor(s) 610 control the overall operation of the processing device 600. Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 611 may store data and instructions that configure the processor(s) 610 to execute operations in accordance with the techniques described above. The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a non-transitory machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method performed by a logistics data server, the method comprising:
    receiving, at the logistics data server, a request from a first mobile device associated with a first user, the request including location data of the first mobile device and an identification of a second user;
    predicting, by the logistics data server, a target location and a target time window based on historical information including location data of a second mobile device associated with the identification of the second user;
    sending, by the logistics data server, a confirmation request to the second mobile device requesting the second mobile device to confirm the request from the first mobile device;
    causing, by the logistics data server, a logistics driver device to update a routing schedule of the logistics driver device to include a navigation route from the location of the first mobile device to the target location in accordance with the target time window;
    establishing, by the logistics data server, a communication channel between the logistics driver device and at least one of the first mobile device or the second mobile device in response to an inquiry received from the logistics driver device regarding the request from the first mobile device;
    sending, by the logistics data server, a confirmation to the first and second mobile devices in response to the logistics data server receiving a message from the logistics driver device indicating that the logistics driver device has commenced the navigation route; and
    sending, by the logistics data server, a confirmation to the first and second mobile devices in response to the logistics data server receiving a message from the logistics driver device indicating that the logistics driver device has completed the navigation route;
    wherein street house numbers are not available for the location of the first or second user or the street house numbers are not used for the navigation route, and the location data of the first and second mobile devices include satellite navigation system coordinates and need not include street house numbers.

2. The method of claim 1, wherein the location data of the first and second mobile device further include assisted GPS information, cellphone network information, WiFi network information, or a textual information.

3. The method of claim 1, further comprising:
    storing, in a user location database of the logistics data server, the location data of the first mobile device as a candidate location for expediting future requests from the first mobile device.

4. The method of claim 1, further comprising:
    determining, by the logistics data server, whether to accept and conduct the request from the first mobile device based on the location data of the first and second mobile devices, and the target time window;
    generating, by the logistics data server, a price quote based on the location data of the first and second mobile devices and the target time window;
    sending, by the logistics data server, a price quote to the first or second mobile device depending on a determination on whether the first user or the second user is responsible for paying a logistics cost; and
    receiving, by the logistics data server, a price quote acceptance message from the first or second mobile device.

5. The method of claim 1, further comprising:
sending, by the logistics data server, a rejection message to the first mobile device indicating that the request from the first mobile device has been rejected, in response to a message from the second mobile device rejecting the request from the first mobile device.

6. The method of claim 1, further comprising:
sending, by the logistics data server, a job request to the logistics driver device including an instruction for the logistics driver device to display a prompt to collect a cash from the second user upon completion of the navigation route.

7. The method of claim 1, wherein the first and second users are a seller and a buyer on an internet consumer-to-consumer auction website.

8. The method of claim 1, wherein the communication channel is a textual or audio communication channel between the first mobile device and the logistics driver device.

9. The method of claim 1, wherein the communication channel is a textual or audio communication channel between the second mobile device and the logistics driver device.

10. A computer-implemented method performed by a logistics data server, the method comprising:
receiving, at the logistics data server, a message including a customer's order and location data of a mobile device of the customer;
storing, in a user location database of the logistics data server, the location data of the mobile device as a location entry associated with an identification of the customer;
receiving, at the logistics data server from a logistics driver device, a location inquiry indicating that the logistics driver device needs location information to fulfill a task of the order;
predicting, by the logistics data server, a target location based on the location entry and historical location data of the mobile device stored in the user location database as a plurality of location entries associated with the identification of the customer;
causing, by the logistics data server, the logistics driver device to update a routing schedule of the logistics driver device to include a navigation route ending at the target location as the location information to fulfill the task;
establishing, by the logistics data server, a communication channel between the logistics driver device and the mobile device of the customer in response to an inquiry received from the logistics driver device regarding the task; and
receiving, at the logistics data server from the logistics driver device, a confirmation that the task has been completed;
wherein street house numbers are not available for the location of the customer or the street house numbers are not used for the task, and the location data of the mobile device include satellite navigation system coordinates and need not include street house numbers.

11. The method of claim 10, wherein the order is an online purchase order with an e-commerce server placed by the customer using the mobile device, and the method further comprises relaying the online purchase order to the e-commerce server.

12. The method of claim 10, wherein the customer has placed the order through a mobile logistics application running on the mobile device, and the customer has confirmed to send out the location data through the mobile logistics application.

13. The method of claim 12, wherein the mobile logistics application identifies whether the location is categorized as residence location, work location, or school location, and the user location database stores the categorization associated with the location.

14. The method of claim 10, further comprising:
receiving, at the logistics data server, a preferred time window from the mobile device of the customer.

15. The method of claim 10, wherein the identification of the customer includes a cellphone number of the mobile device, a name of the customer, a customer ID number of the customer, a government-issued ID number of the customer, or an identification of location of the mobile device of the customer.

16. The method of claim 10, further comprising:
sending all location entries stored in the user location database associated with the identification of the customer, including the location data of the mobile device of the customer, to the logistics driver device.

17. The method of claim 10, further comprising:
receiving, at the logistics data server from the logistics driver device, the location information of the logistics driver device when the task is successfully completed; and
storing, in the user location database of the logistics data server, the received location information of the logistics driver device as a confirmed location entry associated with the identification of the customer.

18. The method of claim 10, further comprising:
sending, from the logistics data server to the mobile device of the customer, a current location of the logistics driver device in response to a status inquiry.

19. The method of claim 10, further comprising:
predicting, by the logistics data server, a time that the customer is likely to be located at the target location based on a historical order and location information associated with the customer.

20. The method of claim 19, wherein to update a routing schedule of the logistics driver device to include the navigation route to the target location comprises:
inserting a task into the routing schedule of the logistics driver device based on the predicted time.

21. The method of claim 10, further comprising:
relaying to the logistics driver device the customer's textual message that includes latest information required to complete the navigation route.

22. A computer-implemented method performed by a logistics data server, the method comprising:
receiving, at the logistics data server, a return message indicating that a customer has used a mobile device to initiate an order return process and location data of the mobile device;
storing, in a user location database of the logistics data server, the location data of the mobile device as a location entry associated with an identification of the customer;
receiving, at the logistics data server from a logistics driver device, a location inquiry indicating that the order return process has been approved and that the logistics driver device needs location information to fulfill a task of the order return process;
predicting, by the logistics data server, a target location based on the location entry and historical location data of the mobile device stored in the user location database as a plurality of location entries associated with the identification of the customer;

causing, by the logistics data server, the logistics driver device to update a routing schedule of the logistics driver device to include a navigation route commencing at the target location as the location information to fulfill the task;

establishing, by the logistics data server, a communication channel between the logistics driver device and the mobile device of the customer in response to an inquiry received from the logistics driver device regarding the task; and receiving, at the logistics data server from the logistics driver device, a confirmation that task has been completed;

wherein street house numbers are not available for the location of the customer or the street house numbers are not used for the order return process, and the location data of the mobile device include satellite navigation system coordinates and need not include street house numbers.

23. The method of claim 22, wherein the return message further indicates that the target location is the same as a location of an original purchase order associated with the order return process, and wherein the logistics data server relays the location of the original purchase order to the logistics driver device.

* * * * *